No. 774,168. PATENTED NOV. 8, 1904.
A. FORNANDER.
WINDMILL.
APPLICATION FILED JUNE 18, 1904.
NO MODEL.
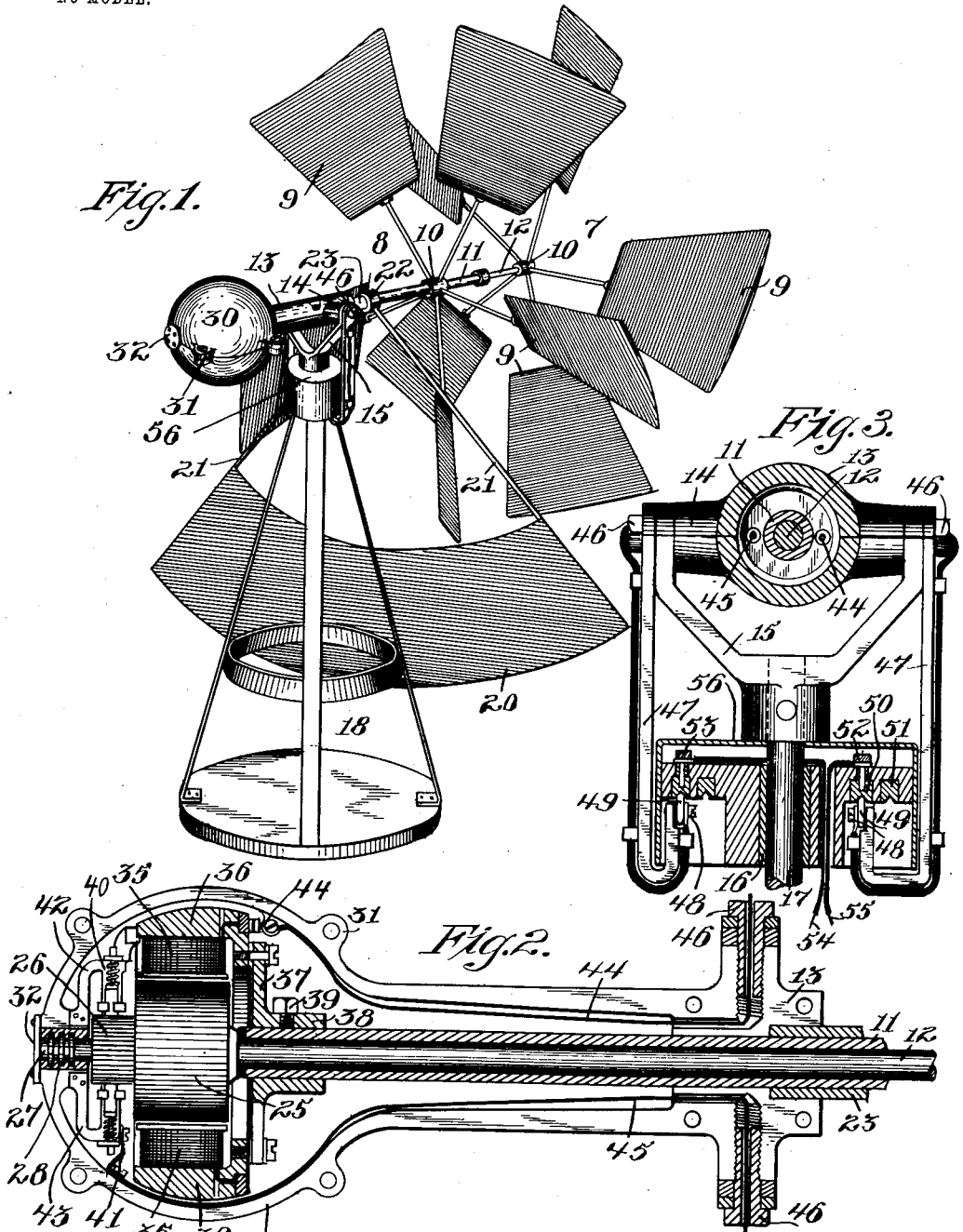
Witnesses:
F. E. Maynard
C. C. Fuss
Inventor:
Alfred Fornander;
By his Attorney,
F. A. Richards.

No. 774,168.

Patented November 8, 1904.

UNITED STATES PATENT OFFICE.

ALFRED FORNANDER, OF NEW YORK, N. Y., ASSIGNOR OF ONE-HALF TO ANTHONY SCHULTE, OF NEW YORK, N. Y.

WINDMILL.

SPECIFICATION forming part of Letters Patent No. 774,168, dated November 8, 1904.

Application filed June 18, 1904. Serial No. 213,107. (No model.)

*To all whom it may concern:*

Be it known that I, ALFRED FORNANDER, a subject of the King of Sweden and Norway, residing in New York, in the county of New York and State of New York, have invented certain new and useful Improvements in Windmills, of which the following is a specification.

This invention relates to windmills, and has for an object to provide for the generation of an electric current by a windmill.

In the drawings accompanying and forming a part of this specification, Figure 1 is a perspective view of a windmill embodying my present improvements. Fig. 2 is a central section of a generator and the windmill-shafts, partly shown in plan view. This figure shows the two concentric shafts of the windmill and also illustrates the application of an armature to one of such shafts and a field-magnet to the other, and Fig. 3 is a section a little to the left in Fig. 1 of the trunnion upon which the shaft-bearing is supported and illustrates means whereby the current may be carried from the generator to the line-wire.

Similar characters of reference indicate like parts in the several figures of the drawings.

This invention has particularly in mind the doing away with gearing, shafting, and belting connecting wind-wheels with electric generators and provides for direct connection between the wind-wheels and the movable parts of the generator. It also embodies the feature of utilizing a number of concentrically-mounted wheels rotatable in opposite directions. Such wheels are designated in a general way by 7 and 8, respectively, and each of which comprises a number of blades 9, mounted upon hubs 10. The blades on the respective hubs are set in opposite directions, so that a current of wind passing through them will drive them in opposite directions. One of the hubs, 10, is mounted upon a hollow shaft 11, having suitable bearing, and the other of which hubs is mounted upon a shaft 12, having a bearing within the shaft 11. The bearing-block is designated by 13 and has trunnions, as 14, from its sides, which trunnions are mounted in a yoke 15, swiveled in a bearing 16 by means of a shaft 17 in the nature of a pin and which bearing-block is supported by a framework (designated in a general way by 18) and the structure of which framework and connected parts may be varied as occasion may demand.

This invention has special reference to such a form of windmill as is illustrated in my United States Letters Patent No. 756,616, dated April 5, 1904, for windmills, wherein the wind-wheels are moved out of the current of air in proportion to the intensity thereof and the work to be performed, and such movement by the wind may be accomplished by a vane 20, supported by arms 21, carried by a hub 22, fast upon the sleeve 23, which is connected with the bearing-block, and this vane 20 is disposed in a direction generally transverse to the direction of the wind, whereby upon the wind increasing in velocity or force the wheels will be moved to present their vanes with less driving-surface to the wind, and thereby reduce the force exerted upon them, thus automatically regulating the developed power of the wheels. It will be observed that the vane 20 is somewhat segmental and lies below the vanes or blades 9, whereby it will not obstruct the current of air passing to such blades. In my aforesaid United States patent it will be seen that there is provided a system of gearing whereby the rotation of the wheels by the wind may be availed of for practical purposes. As is well known gearing and shafting produce in use a certain amount of friction and loss of power, and the object of the present invention is to directly couple a dynamo or electric generator to the shafts of the wheels. This task could be somewhat simplified were the shafts always maintained upon a fixed horizontal plane; but as the shafts have a universal movement, a movement upon a horizontal plane to keep into the wind (the vane 20 assisting in that regard) and also a movement upon a horizontal axis for the regulation, it becomes necessary to employ features not heretofore embodied in the application of direct driving for electric generators. I have therefore shown mounted upon the shaft 12 an armature 25, carrying a commutator-disk 26, and such shaft may be continued into a thrust-bearing portion 27, having a thrust-bearing bushing 28, located in a bearing of the casing 29, which casing is adapted to surround the generator and the back portion of the shafting. The casing may be somewhat spherical, and the lid portion 30 may be fastened by means of suitable screws and lugs 31, whereby it may be removed as occasion may demand. A plate 32 may be removably attached to the casing to cover the end of the shaft and the thrust-bearing bushings for the purpose of lubrication, repair, and adjustment, as occasion may demand. The coils 35 of the field-magnets are shown mounted upon their bodies 36, which are carried by a spider 37, secured to the shaft 11 by means of a hub 38 and set-screw 39. Thus it will be seen that upon the current of air passing through and against the vanes the wheels will be rotated in opposite directions. The shafts 11 and 12 will also be rotated in opposite directions and in many cases in substantial unison, whereby the field-magnets and armature will be rotated in opposite directions. It will thus be apparent that for a given velocity of wind and rotation of the driving-wheel the relative velocity of the rotation of the armature will be doubled. A further useful feature will be observed from the fact that all the weight of the field-magnets and the armature are available for purposes of momentum, &c., and consequently acting somewhat after the analogy of a balance-wheel. The current will be taken from the commutator by suitable brushes 40 and 41, respectively, supported by arms 42 43, secured to the frame 29. In my aforesaid United States Letters Patent the wind-wheels are shown upon the side of the frame or support away from the wind, whereby the wind applied to the wheels or vanes keeps the same in the wind, obviating the necessity of a special vain for such purpose, and being mounted so as to overhang the point of support it is necessary generally to counterbalance. In the present case the generator and casing will afford a sufficient counterbalance for this purpose. Owing to the fact heretofore alluded to of the universal motion of the shafts, the current cannot be taken directly from the brushes and carried by continuous wires to the point of its utilization or distribution. In the present instance the lead-wires 44 and 45 run from the respective brushes and are carried out of the trunnions through pivot-screws 46 and are carried down the sides of the yoke 15 by suitable supports 47, where they are secured to binding-screws 48, connecting with roller-contacts 49, one of which contacts is adapted to run upon a track 50 and the other of which can run upon a track 51, concentric to the axis of the pintle 17. The tracks are connected by binding-screws 52 53, respectively, with the line-wires 54 55. It will thus be apparent that the movement upon the horizontal axis will not materially affect the wire, there being sufficient elasticity in it to permit it to yield to the slight movement upon the horizontal axis and the track and contact connection will permit the movement about the vertical axis, whereby the current may be readily taken from the generator and carried to the point of distribution or utilization without twisting the wires or recourse to exposed parts. The track connections, &c., are shown suitably housed by a cap 56.

Certain features illustrated herein are claimed in my copending application, Serial No. 215,566, filed July 7, 1904.

It will be apparent to those skilled in the art that various changes in details may be resorted to as practice may demand without departing from the spirit and scope of my invention.

Having thus described my invention, I claim—

1. In a windmill, the combination with a pair of concentrically-mounted shafts, vanes set in opposite directions and carried by said shafts respectively, an electric generator comprising an armature and field-magnets, and mounted respectively upon said shafts, whereby upon the passage of the current of air through the vanes the armature and field-magnets will be rotated in opposite directions respectively.

2. In a windmill, the combination with a pair of shafts, one having a bearing within the other, wind-wheels mounted upon said shafts and adapted for opposite rotation, a universal joint for supporting said shafts, and an electric generator adapted to be operated by said shafts and carried by the universal joint.

3. The combination in a windmill, of a pair of shafts one mounted within the other and concentric to each other, a bearing to support the same, a trunnion for the bearing and having a substantially horizontal axis, a yoke supporting the trunnion, a pivot for the yoke upon a substantially vertical axis, an electric generator having its armature connected to one shaft and its field-magnets to the other shaft, a casing for such generator carried by the trunnion, brushes carried by the casing, lead-wires running from the brushes through openings in the trunnions, a housing below the yoke, a pair of concentric tracks within such housing, binding-posts connected to the respective tracks, line-wires leading to the binding-posts, arms carried by the yoke and entering the housing and carrying contact-wheels running upon the respective tracks, and binding-posts for connecting the respective lead-wires to said roller-contacts, wind-wheels upon the respective shafts adapted for rotation in opposite directions, and a vane carried by the bearing to oscillate the same upon its horizontal axis.

4. In a windmill, the combination with air-propelled means, of shafting carrying the same, and an electric generator directly connected to said shafting, said electric generator comprising an armature and field-magnets respectively rotatable in opposite directions.

5. A windmill comprising a standard, a pair of wind-wheels adapted for rotation in opposite directions, bearings for said wheels, a universal connection between said bearings and standard, an electric generator carried by said universal connection and having an armature and field-magnets adapted for rotation in opposite directions and respectively directly connected to the said wheels.

6. In a windmill the combination with a wind-wheel, a universal joint for supporting said wheel, and an electric generator directly connected to said wheel and carried by said universal joint.

7. The combination in a windmill, of a standard, a wind-wheel, a bearing to support the same, a trunnion for the bearing and having a substantially horizontal axis, a yoke supporting the trunnion, a pivot for the yoke and carried by the standard upon a substantially vertical axis, a pair of concentric tracks fast to the standard, line-wires leading to the tracks, arms carried by the yoke and carrying contact-wheels running upon the respective tracks, an electric generator directly connected to the wind-wheel, a casing for such generator carried by the trunnion, lead-wires from the generator running to said roller-contacts, and means carried by the bearing-block to oscillate the same upon its horizontal axis.

8. The combination in a windmill, of a standard, a wind-wheel, a bearing to support the same, a trunnion for the bearing and having a substantially horizontal axis, a yoke supporting the trunnion, a pivot for the yoke carried by the standard upon a substantially vertical axis, an electric generator connected to said wind-wheel and carried by the trunnion, brushes carried by the casing, lead-wires running from the brushes, a housing below the yoke and opening downwardly, a pair of concentric tracks within such housing, line-wires connected to the respective tracks, arms carried by the yoke and bending into the housing and carrying contact-wheels running upon the respective tracks and carrying said lead-wires, and means for connecting the lead-wires to said roller-contacts, and a vane carried by the bearing-block to oscillate the same upon its horizontal axis.

Signed at Nos. 9 to 15 Murray street, New York, N. Y., this 17th day of June, 1904.

ALFRED FORNANDER.

Witnesses:
CHAS. LYON RUSSELL,
JOHN O. SEIFERT.